Oct. 2, 1951 R. H. JOHNSON 2,570,129
SUPERSONIC WIND TUNNEL
Filed Aug. 18, 1948
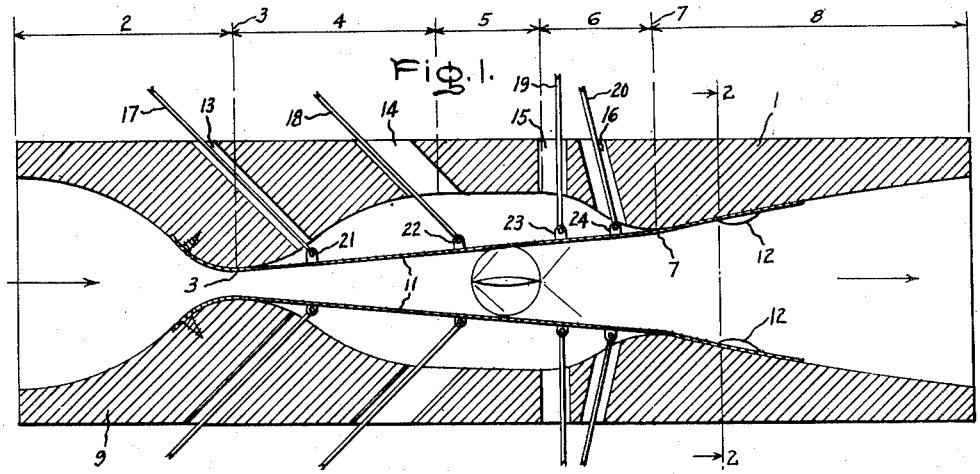
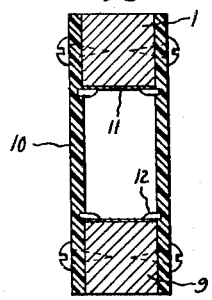
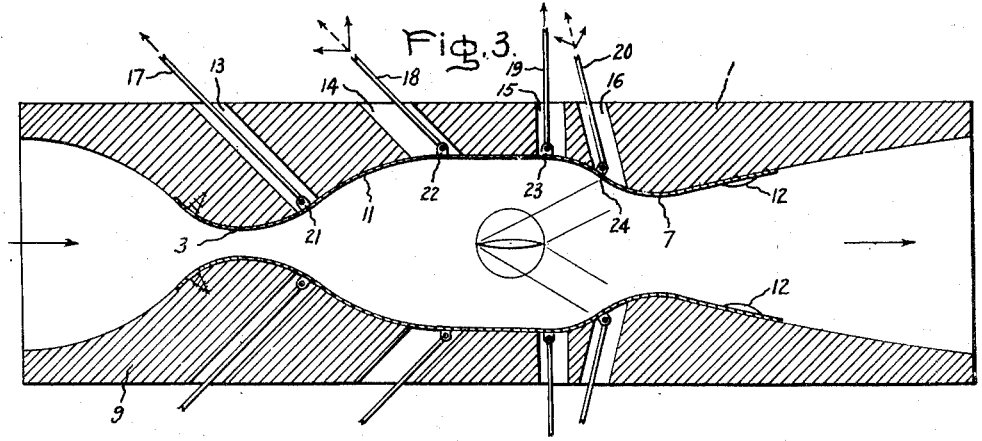
Inventor:
Robert H. Johnson,
by Richard E. Hosley
His Attorney.

Patented Oct. 2, 1951

2,570,129

UNITED STATES PATENT OFFICE 2,570,129

SUPERSONIC WIND TUNNEL

Robert H. Johnson, Schenectady, N. Y., assignor to General Electric Company, a corporation of New York Application August 18, 1948, Serial No. 44,936

6 Claims. (Cl. 73—147)

My invention relates to supersonic wind tunnels and more particularly to a supersonic wind tunnel in which the starting losses are relatively low and to the special method employed in obtaining low starting losses.

In supersonic wind tunnels at the point of minimum area, the throat of the flow channel, the Mach number is theoretically equal to 1. As is known in the art, the Mach number that is attained at any point in the flow channel downstream of the throat is a function of the ratio of the area of the channel at that point to the area of the throat. An increasing area ratio downstream of the throat is accompanied by an increasing Mach number and as the Mach number increases the static pressure decreases. The supersonic state is an unstable state and there is a tendency of the entire flow system to return to the subsonic state which entails an increase in the entropy level accompanied by instantaneous variations in the pressure, temperature, and velocity of the fluid. This change from a supersonic state of flow to a subsonic state of flow occurs almost instantaneously and is known as a shock. The higher the Mach number at which the shock occurs, the greater are the losses in the system. Therefore, it is very desirable to have the transformation from supersonic to subsonic flow occur at a low shock Mach number. However, since the Mach number is a function only of the area ratio, the most efficient shock occurs at a point at which the Mach number is slightly greater than 1 and this point is one at which the area is slightly greater than the throat area.

The ordinary supersonic wind tunnels have an expanding section after the throat of the wind tunnel. In an effort to cut operating losses, supersonic wind tunnels have been built with a throat, an expanding section, a test section, a contracting section down-stream of the tunnel test section, and then down-stream of the contracting section is located a second throat which is to some extent of greater area than the first throat. Inasmuch as the entropy level of the fluid in the tunnel has increased between the first and second throat due to frictional losses, boundary layer losses, losses due to the drag of the model being tested, and other minor losses which may occur between the first and second throats, the second throat must of necessity be greater than the first throat so that choking does not occur in the second throat.

In operating a standard supersonic wind tunnel in which there are two throats and a test section between the two throats, after choking is established in the first throat at which time the Mach number is 1 at the first throat, as the pressure differential across the wind tunnel is increased the supersonic flow starts down the expanding section of the wind tunnel, the downstream boundary of said supersonic flow being a shock wave. As the pressure differential is increased the shock wave moves through the expanding section into the test section then through the test section into the contracting section whereupon the shock jumps through the second throat to some point beyond the second throat compatible with the existing pressure differential. At that time supersonic flow fills the entire channel between the first and second throats and up to the shock wave. Then by reducing the pressure differential the shock can be made to back up to as close to the second throat as possible and in that way the operating losses are reduced because the shock Mach number is reduced. Because of the difficulty entailed in pulling the shock through the second throat it has been the practice to make the second throat very much greater than the first throat and once the shock is pulled through the second throat, then by some mechanical means the second throat is closed down to a point which still permits the total mass flow to pass and then the shock is backed-up close to the second throat. In that manner losses are reduced by lowering the shock Mach number. These methods take care of the problem of reducing the operating power losses.

The question of economic starting of the supersonic wind tunnel still poses an unsolved problem. In the known methods of operation, since the moving shock must traverse the greatest area between the first and second throats it is necessary that sufficient power be supplied to obtain a pressure differential that corresponds to the losses across the shock when the maximum Mach number is obtained between the first and second throats. Thus, the power systems of supersonic wind tunnels are designed to supply sufficient power at the above critical point which point is a function of the maximum Mach number obtained in the tunnel. But once supersonic flow is established between the two throats, the power requirements are only those necessary to maintain the mass flow through the tunnel and to satisfy the pressure differential corresponding to the shock Mach number which is beyond the second throat. At present, the power requirements necessary to maintain mass flow are much smaller than those required for starting the supersonic tunnel.

If the necessity of the movement of the shock wave through the entire range of Mach numbers occurring between the first and second throats can be eliminated, then the starting power requirements of the supersonic wind tunnel can be greatly reduced and the power requirements needed for operation of such a wind tunnel would only be those power requirements necessary to maintain mass flow through the second tunnel to a point beyond the second throat.

Thus, one of the objects of my invention is to provide a new type of supersonic wind tunnel.

Another object of my invention is to provide a supersonic wind tunnel which has lower starting power requirements.

Another object of my invention is to provide a supersonic wind tunnel that is easily constructed and is readily adaptable to ordinary sources of power and whose power requirements are relatively low and comparable to the power requirements for the maintenance of mass flow through the tunnel.

Further objects and advantages of my invention will become apparent as the following description proceeds and the features of novelty which characterize my invention will be pointed out with particularity in the claims annexed to and forming a part of this specification.

In the drawing, Fig. 1 is a side view of a two-dimensional type supersonic wind tunnel embodying elements of my invention. It is called a two-dimensional type tunnel because the contour of sections parallel to the one shown are identical and the only variations in contour occurs as one goes up-stream or down-stream in the channel. In the two-dimensional tunnel, the area at any section is a function only of the ordinate of the section. In Fig. 1, the tunnel is shown as it will appear during the starting of the tunnel.

Fig. 2 is a cross section view of the tunnel at the plane 2—2 shown in Fig. 1.

Fig. 3 shows the supersonic tunnel as it will appear during tests after supersonic flow has been established throughout.

In Fig. 1, I have shown a supersonic wind tunnel nozzle contour block 1 which is shaped on one side so as to form one wall of the two-dimensional supersonic channel. The various sections of the contour are an inlet subsonic nozzle 2, a first throat 3, a supersonic expansion contour 4, a parallel wall test section region 5, a supersonic compression contour 6, a second throat 7, and a subsonic type diffuser 8. The opposite mating nozzle contour block 9 is a mirror image of the one just described and the remaining two walls are parallel flat plates 10 which are fastened to and keep in alignment contour blocks 1 and 9.

There are further provided two flexible metal strips 11 which are of the same width as the flow channel and which are so fastened to the contour blocks as to fit the contour of the subsonic nozzle inlet 2 up to the first throat 3. Then the metal strips extend at substantially a constant slope until they meet the contour blocks at substantially the second throat 7 and from then on the metal strips follow the contour of the diffuser 8. From the second throat on down-stream, the strips 11 are held in place along the contour of the nozzle blocks by members 12 in such a manner that the strips 11 may slide along the contours either up-stream or down-stream as the occasion demands. These members 12 are fastened to the parallel walls of the tunnel and project into the airstream. They, together with the nozzle blocks, form slots through which pass flexible metal strips 11. Members 12 serve to keep strips 11 against the surface of contour blocks 1 and 9 but do not restrict the movement of strips 11 in an up-stream or down-stream direction.

In the nozzle contour blocks 1 and 9, at predetermined positions as will be hereinafter described, are a plurality of slotted holes 13, 14, 15 and 16 through which extend a plurality of actuating rods or cables 17, 18, 19 and 20 which are fastened to tabs 21, 22, 23 and 24 welded to the back side of metal strips 11. By attaching the tabs 21, 22, 23 and 24 to the strip 11 at certain predetermined points and by exerting forces upon the actuating rods or cables in certain directions, as will be hereinafter described, the flexible walls may be pulled out of the position shown in Fig. 1, and be made to assume the contours of the nozzle blocks, as shown in Fig. 3. The nozzle blocks may be so shaped that when the metal strips are in position against the contour blocks, the inside contour and ordinates of the metal strip satisfy the design configurations and ordinates of a theoretically shock-free supersonic nozzle. By providing means to permit the metal strips to slide along the contour of the block from the second throat on down-stream, resistance to the deformation, which would otherwise be brought about by the forcing of the metal strips to conform to the contour of the blocks, is prevented.

It has been found that a shockless supersonic nozzle must conform to a certain shape. The supersonic expansion region may be of two types. In one, the supersonic expansion region is made up of two curves, the first, immediately down-stream of the throat, is convex and ends at a point at which source flow is obtained in the channel. The second curve starts at the axis of the tunnel, the point of juncture between the first and the second curve being an inflection point. The purpose of the two contours is that the first convex curve expands the parallel flow to source flow and the second concave curve returns the source flow to parallel flow which is desired in the test section of the tunnel. In the second shape, the supersonic expansion region is made up of the same two curves, as described above, but they are separated by a diverging straight-walled portion in which source flow prevails.

In either of the two types, it is essential that the force applied to deform the flexible wall be applied at the terminus of the convex curve, which in the first case is at the inflection point, and in the second case is at the terminals of the straight source flow section. The force should be a tension force applied perpendicular to the wall at the point of application and in that way the flexible wall is made to conform to the contour of the convex section.

In order to make the flexible wall conform to the contour of the second or concave section, it is necessary that a force be applied in such a manner that there is a tendency of the flexible wall to buckle, for through a buckling configuration the flexible wall can be made to fit a concave surface. This buckling force must be applied to the flexible wall as if it were a column, or in other words in a direction up-stream in the tunnel and parallel to the face of the wall.

Thus, the important predetermined points of attachment of tabs 21, 22, 23 and 24 are shown as follows:

Tab 21 is fastened at the inflection point of the supersonic expansion section. Tab 22 is fastened to the point joining the expansion section to the test section. Tab 23 is attached to the point at the end of the test section and at the beginning of the supersonic compression section and tab 24 is at the inflection point of the supersonic compression section. The direction of the forces impressed upon the rods or cables 17, 18, 19 and 20 is shown by arrows in Fig. 3. The force impressed upon members 18 and 20 are shown in component form so that it can be more clearly seen how forces are provided to obtain the buckling of member 11 discussed above.

In operation, a driving system which may be either a blower type system or an induction type system is started up and operated until a pressure differential is obtained at which choking occurs at the first throat at which time the Mach number is equal to 1 at the throat. The flexible strips 11 at that time are in their normal unflexed position, thus giving a substantially straight walled expanding section down-stream of the first throat. Although some losses occur in the section down-stream of the first throat due to the incorrect contour for the supersonic expansion which occurs after the first throat, these losses are relatively small. After supersonic flow is established, the pressure differential is increased driving the shock wave down-stream through the straight taper diffuser formed by the flexible strips 11. When the shock wave reaches a point beyond the second throat 7, the rods or cables 17, 18, 19 and 20 are activated in such a manner that the flexible metal strip 11 is forced to take up the contour of the contour block in the regions of the supersonic expansion contour 4, the parallel wall test section 5, and the supersonic compression contour section 6. In order that the metal strip 11 may take up this contour, part of the metal strip which extends into diffuser 8 slides forward being held in position by strips 12 and provides a sufficient length of strip to satisfy the increase in length demanded by the contour of the contour block. Inasmuch as supersonic flow has been established between the first and second throat, this flexing of the metal wall between the two throats does not disturb the flow and, in fact, once the flexible strip assumes the contour of the contour block, the losses in the section between the two throats is considerably reduced over what they were when the metal strip was in the straight unflexed position. Since the losses are reduced, the shock wave down-stream of the second throat will travel further down-stream in the diffuser 8. By reducing the pressure differential, the shock wave can be made to back-up close to the second throat thus reducing the operating losses. It will be obvious that by this starting procedure the tremendous pressure differentials required to move the shock through a region of high Mach number is eliminated and only a pressure differential slightly greater than that necessary to maintain mass flow through the channel is needed to start the supersonic tunnel. It will be noted that the direction of force applied to the metal strip by rod or cable 17 is in a direction substantially perpendicular to the contour of the contour block at that point. This is also true for the direction of force exerted by rod or cable 19 attached to that part of the strip within the parallel wall test section 5. However, it will be noted that the direction of the forces on rods or cables 18 and 20 are different than on the other two members 17 and 19. The purpose is to have a component of the force transmitted through the flexible metal strip in a direction up-stream. In this way the flexible metal strip is made to fit the supersonic expansion contour 4 very closely for since that contour is concave it is necessary that an axial force on this strip be exerted so that it will assume the contour of the block behind it. Of course, this does not assure the adherence of the flexible metal strip to the exact contour of the supersonic compression region 6, but inasmuch as the important region for supersonic flow is the test section 5 which occurs up-stream of the supersonic compression section 6, those disturbances which occur, due to deviations from the theoretical shock-free shape of section 6, do not effect the flow which occurs in the section 5 because in supersonic flow a disturbance that occurs down-stream of a certain point will not effect the flow that occurs up-stream of that point.

While I have shown a particular embodiment of my invention, it will be understood, of course, that I do not wish to be limited thereto, since many modifications may be made, and I therefore contemplate by the appended claims to cover any modifications as fall within the true spirit and scope of my invention.

What I claim as new and desire to secure by Letters Patent of the United States is:

1. A two-dimensional, two-throated supersonic wind tunnel comprising mating nozzle blocks of preshaped contour and connection side walls defining with said blocks a fluid flow passageway, a flexible wall attached to each nozzle block in advance of the first throat and following the contour of said nozzle block substantially to the first throat in said tunnel, said flexible wall then initially running straight and diverging at a constant slope downstream of said first throat at least to the second throat, and means for deforming said straight section of the flexible walls to conform with the contour of said nozzle blocks.

2. A two-dimensional supersonic wind tunnel comprising nozzle blocks of pre-shaped contour forming, in order progressing down-stream, an inlet nozzle section, a first throat, a supersonic expansion section, a parallel walled test section, a supersonic compression section, a second throat, and a diffusing section, a pair of flexible walls attached to said nozzle blocks and following the contour of said nozzle blocks substantially to the first throat in said tunnel, the said flexible walls then running straight and diverging at constant slope down-stream of the said first throat, and means for deforming said straight sections of the flexible walls to conform with the contour of said nozzle blocks.

3. A two-dimensional supersonic wind tunnel comprising nozzle blocks of pre-shaped contour forming, in order progressing down-stream, an inlet nozzle section, a first throat, a supersonic expansion section, a parallel walled test section, a supersonic compression section, a second throat, and a diffusing section, a pair of flexible walls attached to said nozzle blocks and following the contour of said nozzle blocks substantially to the first throat in said tunnel, said flexible walls then running straight and diverging at constant slope down-stream of the first throat substantially to the second throat, said flexible walls then following the contour of said nozzle blocks down-stream of the second throat and being free to slide along the contour of the nozzle block in both an up-stream and down-stream direction, and means for deforming said straight sections of the flexible wall to conform with the contour of said nozzle blocks.

4. A two-dimensional supersonic wind tunnel comprising nozzle blocks of pre-shaped contour forming, in order progressing down-stream, an inlet nozzle section, a first throat, a supersonic expansion section, a parallel walled test section, a supersonic compression section, a second throat, and a diffusing section, a pair of flexible walls attached to said nozzle blocks and following the contour of said nozzle blocks substantially to the first throat in said tunnel, said flexible walls then running straight and diverging at constant slope down-stream of the first throat substantially to the second throat, said flexible walls then following the contour of said nozzle blocks down-stream of the second throat and being free to slide along the contour of said nozzle blocks in an up-stream and down-stream direction, each nozzle block having a plurality of passageways through which pass force-carrying members attached to the corresponding flexible wall, and means comprising said force-carrying members for deforming said flexible walls to conform with the contour of said nozzle blocks.

5. A two-dimensional two-throated supersonic wind tunnel comprising nozzle blocks of pre-shaped contour, a pair of flexible walls attached to said nozzle blocks and following the contour of said nozzle blocks substantially to the first throat in said tunnel, said flexible walls then running straight and diverging at constant slope down-stream of said first throat, each nozzle block having a plurality of passageways through which pass tension members attached to the corresponding flexible wall and means comprising said tension members for deforming the flexible walls to conform with the contour of said nozzle blocks.

6. A two dimensional supersonic wind tunnel comprising nozzle blocks of pre-shaped contour forming, in order progressing down-stream, an inlet nozzle section, a first throat, a supersonic expansion section, a parallel walled test section, a supersonic compression section, a second throat, and a diffusing section, a pair of flexible walls attached to said nozzle blocks and following the contour of said nozzle blocks substantially to the first throat in said tunnel, said flexible walls then running straight and diverging at constant slope down-stream of the first throat substantially to the second throat, said flexible walls then following the contour of said nozzle blocks down-stream of the second throat and being free to slide along the contour of the nozzle blocks in an up-stream and down-stream direction and means comprising tension members for deforming the flexible walls to conform with the contour of said nozzle blocks.

ROBERT H. JOHNSON.

REFERENCES CITED

The following references are of record in the file of this patent:

UNITED STATES PATENTS

| Number | Name | Date |
| --- | --- | --- |
| 2,409,433 | Hunter | Oct. 15, 1946 |
| 2,424,654 | Gamble | July 29, 1947 |
| 2,472,949 | Jackson | June 14, 1949 |